United States Patent [19]

Yao

[11] 4,246,154

[45] Jan. 20, 1981

[54] INK COMPOSITION FOR INK JET RECORDING

[75] Inventor: Yasunori Yao, Tokyo, Japan

[73] Assignee: Fuji Photo Film Co., Ltd., Minami-ashigaru, Japan

[21] Appl. No.: 952,880

[22] Filed: Oct. 18, 1978

[30] Foreign Application Priority Data

Oct. 18, 1977 [JP] Japan .................................. 52-124016

[51] Int. Cl.$^3$ ..................... C08L 33/00; C08L 41/00; C08L 43/02; C09D 3/74
[52] U.S. Cl. ...................... 260/29.6 TA; 260/29.6 H; 260/29.6 SQ; 260/29.7 T; 260/29.6 MQ; 260/29.6 MP; 526/240; 526/287; 526/303; 526/304; 526/317; 526/323.2; 526/329.3; 526/328.5
[58] Field of Search .................. 260/29.6 TA, 29.6 H, 260/29.6 SQ, 29.7 T

[56] References Cited

U.S. PATENT DOCUMENTS

| | | | |
|---|---|---|---|
| 2,991,260 | 7/1961 | Auer et al. | 260/29.6 TA |
| 3,223,663 | 12/1965 | Altobelli et al. | 260/29.6 TA |
| 3,223,669 | 12/1965 | Chase et al. | 260/29.6 TA |
| 3,390,010 | 6/1968 | Frerker et al. | 260/29.6 TA |
| 3,560,417 | 2/1971 | Pizzi | 260/29.6 TA |
| 3,766,116 | 10/1973 | Olhoft | 260/29.6 TA |
| 3,978,016 | 8/1976 | Perronin et al. | 260/29.6 TA |

FOREIGN PATENT DOCUMENTS 536864 2/1957 Canada .
2420356 11/1974 Fed. Rep. of Germany .
1573457 5/1969 France .

OTHER PUBLICATIONS

Journal of Polymer Science, Polymer Chemistry Edition, vol. 14 (1976), pp. 2089–2107.

Primary Examiner—Harold D. Anderson
Attorney, Agent, or Firm—Sughrue, Rothwell, Mion, Zinn and Macpeak

[57] ABSTRACT

An ink composition for ink jet recording which is an oil in-water type dispersion prepared by dispersing, in an aqueous medium, a mixture of a hydrophobic dye solution and finely divided particles of vinyl polymer, wherein the vinyl polymer is essentially insoluble in water and does not swell in water but swells in solvents capable of dissolving hydrophobic dyes, said ink composition having a low viscosity, a high density and being very stable. The records obtained using this ink composition are not smeared or removed upon contact with water or perspiration.

9 Claims, No Drawings

INK COMPOSITION FOR INK JET RECORDING

BACKGROUND OF THE INVENTION

1. Field of Invention

The present invention relates to an ink composition for ink jet recording and particularly concerns an ink composition suitable for (i) ink jet recording processes in in which the ink is jetted by a rapid decrease in the inner volume of an ink container or by extrusion or suction from an ink container under a definite externally applied pressure; (ii) an ink jet recording process in which the ink is electrostatically accelerated across a potential difference created by a signal applied between a nozzle and the counter electrode of the printer; or (iii) an ink mist recording process in which an ink mist is generated using ultrasonic vibration.

2. Description of the State of the Art

The following characteristics are required of an ink employed in the above-described ink jet or ink mist processes.

(i) that the ink have a density sufficiently high to record clear dark images, (ii) that the ink not stop up the jet nozzle, (iii) that the ink not change in its physical properties or give rise to precipitates (coagulate) upon storage, and (iv) that the ink be capable of producing records which are not smeared or removed when wetted with water or perspiration.

The addition of dyes in a high concentration to various sorts of conventionally prepared hydrophobic inks is difficult, because the addition is accompanied by an increase in viscosity of the ink and, even if solvents of low viscosity are used to dissolve the dyes, the dyes tend to separate out as the low viscosity solvents evaporate. Too high a viscosity and formation of dye precipitates are fatal defects in an ink to be used in an ink jet recording process wherein the ink is forced (jetted) through a fine nozzle.

SUMMARY OF THE INVENTION

Therefore, an object of the present invention is to provide a color ink utilizing hydrophobic dyes, which possess both desirable physical properties and sufficiently high density which are necessary to record clear dark images using the ink jet recording process.

In accordance with the present invention, it has been found that a low viscosity and high density ink suitable for ink jet recording processes can be produced by dispersing into an aqueous medium finely divided particles of vinyl polymer impregnated with a hydrophobic dye solution.

Another object of the present invention is to provide a hydrophobic dye-containing ink which may be employed specifically in an ink jet recording apparatus where the ink jet is produced by controlling an electric charge applied to droplets of ink. It is difficult to supply sufficient electric charge to droplets of conventional oily based ink due to the low conductivity of the oily medium used. In addition, a conventional ink having an oily base has the additional disadvantage that a proper solvent must be chosen for each of hydrophobic dyes and consequently, in the case of multicolor recording, the electric field conditions must be changed at the time of recording based upon the recording characteristics of each constituent dye.

In accordance with the present invention, the ink contains water as a medium although hydrophobic dyes are employed therein and, therefore, this ink can be used in an electric charge-controlling type ink jet apparatus without the problems which accompany conventional aqueous inks and, further, in case of multicolor recording, the electric field condition at the time of recording can be made uniform despite differences in the recording characteristics of the constituent dyes.

Still another object of the present invention is to provide an ink which produces records which are not smeared or removed upon contact with water or perspiration.

In accordance with the present invention, the dyes employed in the ink are hydrophobic and they are impregnated in water-insoluble vinyl polymer and as a result, the records which are obtained are completely water resistant.

A further object of the present invention is to provide a color ink consisting of a so-called color latex containing finely divided particles having exceptionally uniform diameter and which does not lose its original color upon mixing with another color ink. This object is attained by using very finely divided particles of vinyl polymer impregnated with a hydrophobic dye. Although a conventional multicolor recording ink suffers from the defect that when inks of different colors are mixed with one another to develop impure colors, the color latex of the present invention enables clear color reproduction free from the color-mixing phenomena since the inks are dissolved or impregnated in vinyl polymer particles.

Another object of the present invention is to provide a stable ink which is not subject to change in physical properties or separation of precipitates causing the ink to stop in the nozzle.

In accordance with the present invention, finely divided particles of a vinyl polymer impregnated with a hydrophobic dye are dispersed in an aqueous medium in the state of a microemulsion without coagulating. The vinyl polymer is made of up extremely small particles having a diameter of preferably 0.1 micron or less and the stability of ink depends on the stability of vinyl polymer particles in the aqueous medium as opposed to the relatively unstable hydrophobic dye.

DETAILED DESCRIPTION OF THE INVENTION

Particles of vinyl polymer used in the present invention are characterized by the following properties; (i) they are essentially insoluble in water and do not swell in water, but (ii) they swell in the organic solvents employable as the solvents for hydrophobic dyes though they are essentially insoluble in the organic solvents for hydrophobic dyes.

Vinyl polymer particles of this type can be produced by emulsion polymerization of vinyl monomers.

The above-described vinyl polymer particles are produced by emulsion polymerization of (1) each of (A) at least one monomer selected from the group consisting of vinyl monomers having at least a free carboxylic acid group, a free sulfonic acid group or a free phosphoric acid group or a salt thereof and (B) at least one monomer selected from the group consisting of monomers represented by the following general formula (I)

(I)

wherein X is a hydrogen atom, a methyl group or a —COOR¹ group; Y is a hydrogen atom, a methyl group or a —(CH$_2$)$_n$COOR² group; Z is an aryl group, a —COOR³ group or a

group; R¹, R² and R³, which may be the same or different, each represents an aliphatic group or an aryl group; and n is an integer of 0 to 3; or (2) each of (A) at least one monomer selected from the group consisting of the vinyl monomers described above, (B) at least one monomer selected from the group consisting of monomers represented by the general formula (I) above, and (C) at least one monomer selected from the group consisting of monofunctional or polyfunctional unsaturated monomers other than those monomers described in (A) and (B) above which are copolymerizable with the monomers described in (A) and (B) above and selected from the group consisting of acrylamides, methacrylamides, vinyl ethers, vinyl ketones, allyl compounds, olefins and unsaturated nitriles.

Monomers of (A), (B) and (C) are illustrated in greater detail below.

The vinyl monomers (A), hereinafter Group (A) monomers, may also contain alkoxycarbonyl groups, aryl groups and carbamoyl groups in addition to the above described carboxylic, sulfonic and phosphoric acid groups. Further, the above described acid groups may be linked directly to or may be linked through an atom or an atomic group to the ethylene residue (moiety).

Examples of the monomers of Group (A) include the following monofunctional monomers:

acrylic acid, methacrylic acid, itaconic acid, maleic acid, monoalkyl itaconates (for example, monomethyl itaconate, monoethyl itaconate or monobutyl itaconate, etc.), monoalkyl maleates (for example, monomethyl maleate, monoethyl maleate, monobutyl maleate or monooctyl maleate, etc.), citraconic acid, styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid, etc.), methacryloyloxyalkyl sulfonic acids (for example, methacryloyloxymethyl sulfonic acid, methacryloyloxyethyl sulfonic acid, methacryloyloxypropyl sulfonic acid and methacryloyloxybutyl sulfonic acid, etc.), 2-acrylamido-2-alkylalkane sulfonic acids (for example, 2-acrylamido-2-methylethanesulfonic acid, 2-acrylamido-2-methylpropanesulfonic acid and 2-acrylamido-2-methylbutanesulfonic acid, etc.), 2-methacrylamido-2-alkylalkane sulfonic acids (for example, 2-methacrylamido-2-methylethanesulfonic acid, 2-methacrylamido-2-methylpropanesulfonic acid and 2-methacrylamido-2-methylbutanesulfonic acid, etc.), mono-(acryloyloxyalkyl)phosphates (for example, mono(acryloyloxyethyl)phosphate and mono(3-acryloyloxypropyl)phosphates, etc.) and mono(methacryloyloxyalkyl)phosphates (for example, mono(methacryloyloxyethyl)phosphate and mono(3-methacryloyloxypropyl)phosphate, etc.), etc.

Further, the alkyl moiety in the above-described monomers of Group (A) is, for example, one having 1 to 8 carbon atoms. These acids representative of monomers of Group (A), as vinyl monomers containing a carboxylic acid group, a sulfonic acid group or a phosphoric acid group may also be in the form of the alkali metal salts thereof (preferably, Na⁺ or K⁺) or the ammonium salts thereof.

Examples of suitable aliphatic groups represented by R¹ to R³ in the general formula (I) for monomers of the general formula (I), hereinafter Group (B) monomers, include straight, branched or cyclic alkyl groups and substituted alkyl groups. These alkyl groups or the alkyl moieties thereof preferably have 1 to 12 carbon atoms.

Examples of substituents in the substituted alkyl groups include aryl groups, aryloxy groups, halogen atoms, cyano groups, acyl groups, alkylcarbonyloxy groups, arylcarbonyloxy groups, amino groups (including amino groups substituted with one or two alkyl groups and aryl groups), hydroxy groups, alkoxy groups, and heterocyclic residues (e.g., a 5- or 6-membered ring, which may be unsaturated or saturated and which may be condensed with an aromatic ring and in which the hetero atom includes one or more of an oxygen atom, a nitrogen atom and a sulfur atom, etc.), etc.

Examples of suitable aryl groups represented by R¹ to R³ in the general formula (I) include, of course, both unsubstituted and substituted phenyl and naphthyl groups. Examples of suitable substituents thereof include alkyl groups in addition to the substituents described above the substituted alkyl group for R¹ to R³.

Examples of the monomers of Group (B) include monofunctional monomers such as acrylic acid esters, methacrylic acid esters, crotonic acid esters, vinyl esters, maleic acid diesters, fumaric acid diesters, itaconic acid diesters and styrenes, etc.

Further specific examples of these Group (B) monomers include monofunctional monomers such as methyl acrylate, ethyl acrylate, n-propyl acrylate, isopropyl acrylate, n-butyl acrylate, isobutyl acrylate, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-iso-propoxyethyl acrylate, 2-butoxyethyl acrylate, 2-(2-methoxyethoxy)ethyl acrylate, 2-(2-butoxyethoxy)ethyl acrylate, ω-methoxypolyethylene glycol acrylate (mean polymerization degree of polyethylene glycol is about 9), 1-bromo-2-methoxyethyl acrylate, 1,1-dichloro-2-ethoxyethyl acrylate, methyl methacrylate, ethyl methacrylate, n-propyl methacrylate, isopropyl methacrylate, n-butyl methacrylate, isobutyl methacrylate, sec-butyl methacrylate, amyl methacrylate, hexyl methacrylate, cyclohexyl methacrylate, benzylmethacrylate, chlorobenzyl methacrylate, octyl methacrylate, N-ethyl-N-phenylaminoethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, 2-hydroxyethyl methacrylate, 3-hydroxypropyl methacrylate, 4-hydroxybutyl methacrylate, triethyleneglycol monomethacrylate, dipropyleneglycol monomethacrylate, 2-methoxyethyl methacrylate, 3-methoxybutyl methacrylate, 2-acetoxyethyl methacrylate, acetoacetoxyethyl methacrylate, 2-ethoxyethyl methacrylate, 2-iso-propoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, ω-methoxypolyethylene glycol methacrylate (mean polymerization degree of polyethylene glycol is about 6), vinyl acetate, vinyl propionate, vinyl butyrate, vinyl isobutyrate, vinyl dimethylpropionate, vinyl ethylbutyrate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl-β-phenyl-butyrate, vinyl cyclohexylcarboxylate, vinyl benzoate, vinyl salicylate, vinyl chlorobenzoate, vinyl tetrachlorobenzoate, vinyl naphthoate, styrene, methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, vinylbenzoic acid methyl ester, butyl crotonate, hexyl crotonate, glycerin monocrotonate, dimethyl itaconate, diethyl itaconate, dibutyl itaconate, diethyl maleate, dimethyl maleate, dibutyl maleate, diethyl fumarate, dihexyl fumarate and dibutyl fumarate, etc.

Examples of the monomers other than those of Group (A) and Group (B) and copolymerizable therewith, hereinafter Group (C) monomers, include the following compounds:

acrylamides: for example, methylacrylamide, ethyl acrylamide, propylacrylamide, isopropylacrylamide, butylacrylamide, tert-butylacrylamide, heptylacrylamide, tert-octylacrylamide, cyclohexylacrylamide, benzylacrylamide, hydroxymethylacrylamide, methoxyethylacrylamide, dimethylaminoethylacrylamide, hydroxyethylacrylamide, phenylacrylamide, hydroxyphenylacrylamide, tolylacrylamide, naphthylacrylamide, dimethylacrylamide, diethylacrylamide, dibutylacrylamide, di-isobutylacrylamide, N-(1,1-dimethyl-3-oxobutyl)acrylamide, methylbenzylacrylamide, benzyloxyethylacrylamide, β-cyanoethylacrylamide, acryloylmorpholine, N-methyl-N-acryloylpiperazine, N-acryloylpiperidine, N-(1,1-dimethyl-3-hydroxybutyl)acrylamide, N-β-morpholinoethylacrylamide, N-acryloylhexamethyleneimine, N-hydroxyethyl-N-methylacrylamide, N-2-acetoamidoethyl-N-acetylacrylamide and acrylhydrazine, etc.;

methacrylamides: for example, methylmethacrylamide, tert-butylmethacrylamide, tert-octylmethacrylamide, benzylmethacrylamide, cyclohexylmethacrylamide, phenylmethacrylamide, dimethylmethacrylamide, diethylmethacrylamide, dipropylmethacrylamide, hydroxyethyl-N-methylmethacrylamide, N-methylphenylmethacrylamide, N-ethyl-N-phenylmethacrylamide and methacrylhydrazine, etc.;

allyl compounds: for example, allyl acetate, allyl caproate, allyl caprylate, allyl laurate, allyl palmitate, allyl stearate, allyl benzoate, allyl acetoacetate, allyl lactate, allyloxyethanol, allyl butyl ether and allyl phenyl ether, etc.;

vinyl ethers: for example, methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether and dimethylaminoethyl vinyl ether, etc.;

vinyl ketones: for example, methyl vinyl ketone, phenyl vinyl ketone and methoxyethyl vinyl ketone, etc.;

olefins: for example, unsaturated hydrocarbons such as dicyclopentadiene, ethylene, propylene, 1-butene, 1-pentene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,5,6-trimethyl-1-heptene, 1-dodecene and 1-octadecene, etc.;

unsaturated nitriles: for example, acrylonitrile and methacrylonitrile, etc.

Of these monomers, acrylic acid, methacrylic acid, itaconic acid, 2-acrylamido-2-methylpropanesulfonic acid and phosphoric acid esters having polymerizable unsaturated functional groups as described above (but having a free phosphoric acid group or a salt thereof) are preferred as the monomers of Group (A) from the standpoint of hydrophilic property, hydrophobic property and reactivity of the monomer, or stability, etc. Acrylic acid esters, methacrylic acid esters and styrenes are preferred as monomers of Group (B).

In accordance with the present invention, a preferred amount of monomer component (A) in the vinyl polymer is in the range of about 1 to about 8% by weight, a preferred amount of monomer component (B) is in the range of about 48 to about 99% by weight, particularly preferable is about 77 to about 98% by weight, and a preferred amount of monomer component (C) is in the range of about 0.5 to about 40% by weight, based on the total weight of the vinyl polymer.

The ratio of the above described monomer components is based on the relative ratio of monomers added to a polymerization reactor in the conventional free radical polymerization process.

Typical examples of preferred vinyl polymers include the following materials, but the present invention is not to be construed as being limited to these examples. All ratios in the following examples are by weight.

| Polymer | |
| --- | --- |
| (1) n-Butyl acrylate - propyl acrylamide - methacrylic acid copolymer | (72:20:8) |
| (2) Ethyl acrylate - dipropyl methacrylate - 2-acrylamido-2-methylpropanesulfonic acid copolymer | (62:30:8) |
| (3) Methyl methacrylamide - n-butyl methacrylate - itaconic acid copolymer | (10:85:5) |

-continued

| Polymer | |
|---|---|
| (4) Cyclohexyl methacrylate - n-octyl acrylamide - acrylic acid copolymer | (70:24:6) |
| (5) Benzyl methacrylate - 2-diethyl acrylamide - acrylic acid copolymer | (60:35:5) |
| (6) Phenyl methacrylate - n-butyl acrylamide - sodium 2-methacryloyoxyethyl sulfonate copolymer | (55:40:5) |
| (7) Ethyl methacrylate - 2-acetoxyethylmethacrylamide - acrylic acid copolymer | (74:20:6) |
| (8) n-Butyl methacrylate - 2-hydroxyethyl methacrylamide-acrylic acid copolymer | (90:5:5) |
| (9) n-Butyl methacrylate - benzylmethacrylamide - 2-acrylamido-2-methylpropanesulfonic acid copolymer | (92:4:4) |
| (10) Benzylmethacrylamide - vinyl acetate - sodium 2-methacryloyloxypropanesulfonate copolymer | (30:63:7) |
| (11) Ethyl methacrylate - methyl vinylketone - acrylic acid copolymer | (60:36:4) |
| (12) Vinyltoluene - ethoxyethylacrylamide - acrylic acid copolymer | (63:33:4) |
| (13) Styrene - di-n-butylacrylamide - maleic acid copolymer | (70:27:3) |
| (14) n-Butyl methacrylate - dimethylacrylamide - acrylic acid copolymer | (70:25:5) |
| (15) Cyclohexyl methacrylate - N-(1,1-dimethyl-3-oxobutyl)-acrylamide - acrylic acid copolymer | (60:36:4) |
| (16) n-Butyl methacrylate - tert-butyl acrylamide - acrylic acid copolymer | (70:26:4) |
| (17) n-Butyl methacrylate - acrylonitrile - methacrylic acid copolymer | (80:12:8) |
| (18) n-Butyl methacrylate - ethylene glycol dimethacrylate-acrylic acid copolymer | (92:3:5) |
| (19) n-Butyl methacrylate - acrylonitrile - 2-methylpropane-sulfonic acid copolymer | (75:20:5) |
| (20) Cyclohexylmethacrylate - acrylonitrile - sodium 2-methacryloyloxypropanesulfonate copolymer | (70:27:3) |
| (21) n-Butyl methacrylate - 2-acetoacetoxyethylmethacrylate-sodium-3-methacryloyoxypropane-1-methyl-1-sulfonate copolymer | (85:10:5) |
| (22) n-Butyl acrylate - acrylamide - sodium 2-acrylamido-2-methylpropanesulfonate copolymer | (85:10:5) |
| (23) n-Butyl methacrylate - methyl methacrylate - sodium-2-acrylamido-2-methylpropanesulfonate copolymer | (80:15:5) |
| (24) n-Butyl methacrylate - styrene - sodium 2-acrylamido-2-methylpropanesulfonate copolymer | (60:35:5) |

The vinyl polymer used in the present invention can be synthesized using processes well known to those skilled in the art of synthesizing polymers. The vinyl polymer can easily be synthesized with reference to the descriptions appearing in, e.g., Japanese Patent Publication No. 29,195/72, Japanese Patent Application (OPI) Nos. 37,488/73, 76,593/73, 92,022/73 corresponding to U.S. Pat. No. 3,847,615, 21,134/74 corresponding to U.S. Pat. No. 3,840,371, 120,634/74 corresponding to U.S. Pat. No. 3,963,495 and 72,622/78 (The term "OPI" as used herein refers to a "published unexamined Japanese patent application".), British Pat. Nos. 1,211,039 and 961,395, U.S. Pat. Nos. 2,795,564, 2,914,499, 3,033,833, 3,547,899, 3,227,672, 3,290,417, 3,262,919, 3,245,932, 2,681,897 and 3,230,275, Canadian Pat. No. 704,778, John C. Petropoulos et al *Official Digest* 33 719–736 (1961), Sadao Hayashi *Emulsion Nyumon (Introduction of Emulsion)* (1970), Souichi Muroi *Chemistry of Polymer Latex* (1970), Takuhiko Motoyama *Vinyl Emulsion* (1965) and Mike Shider Juang et al *Journal of Polymer Science, Polymer Chemistry Edition* 14, 2089–2107 (1976). Needless to say, the polymerization initiator, concentration of reactants, the polymerization temperature, reaction time and the like can be varied widely in accordance with the effect desired.

For example, the polymerization is, in general, carried out at 20° to 180° C., preferably 40° to 120° C. using 0.05 to 5% by weight of a free radical polymerization initiator and 0.1 to 10% by weight of an emulsifier based on the amount of monomers to be polymerized.

Suitable polymerization initiators include azobis compounds, peroxides, hydroperoxides, redox catalysts, etc., for example, potassium persulfate, ammonium persulfate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, azobis(2-amidinopropane)hydrochloride and the like.

Suitable emulsifiers include anionic, cationic, amphoteric or nonionic surface active agents and water soluble polymers, for example, sodium laurate, sodium dodecylsulfate, sodium 1-octoxycarbonylmethanesulfonate, sodium laurylnaphthalenesulfonate, sodium laurylbenzenesulfonate, sodium laurylphosphate, cetyltrimethylammonium chloride, dodecyltrimethylammonium chloride, N-2-ethylhexylpyridinium chloride, polyoxyethylene nonylphenyl ether, polyoxyethylene sorbitanelauryl ester, polyvinyl alcohol, water-soluble polymers, emulsifiers described in Japanese Patent Publication No. 6190/78 corresponding to U.S. Pat. No. 4,082,287 and the like.

In addition, commercial vinyl polymer latexes, e.g., Emalex (Meiken Kagaku Co., Ltd.), Saran Latex (Asahi Dow Co., Ltd.), JSR-0670 (Nippon Gosei Gomu Co., Ltd.), Neoacron (Chuo Rikagaku Kogyo Co., Ltd.), Primal (Nippon Acryl Kagaku Co., Ltd.) and Polynil (Arakawa Toryo Kogyo Co., Ltd.) can also be used for the vinyl polymer in the present invention.

As typical examples of aqueous dispersions of vinyl polymer particles, latexes comprising the components set forth above and containing at least about 2 to about 20 wt.% of solid component are suitable. However, the present invention is not limited to the above latexes. A suitable particle size for the vinyl polymer particles is about 0.01 to 5 microns and preferably about 0.05 to 0.5 microns.

The proportion of hydrophobic material with which particles of vinyl polymer may be impregnated ranges from 2.5 to 75 wt.% and is preferably, 5 to about 50 wt.% based on the weight of the polymer. The amount of dye varies depending upon the purpose and application of the final ink composition and the like and is not restricted. The amount of dye used is the amount sufficient to provide a desired density, and such can easily be decided by one skilled in the art.

In the present invention, azo dyes, metal complex type azo dyes, anthraquinone dyes, phthalocyanine dyes, triarylmethane dyes and other hydrophobic dyes which are soluble in organic solvents but not water may be employed.

Specific examples of hydrophobic dyes which are suitable for use in the present invention are listed below by color.

Yellow Dyes: C.I. Solvent Yellow 19 (C.I.13900 A), C.I. Solvent Yellow 21 (C.I.18690), C.I. Solvent Yellow 61, C.I. Solvent Yellow 80, Aizen Spilon Yellow GRH special (Hodogaya Chemical Co., Ltd.), Diaresin Yellow F (Mitsubishi Chemical Industries, Ltd.), Diaresin Yellow A (Mitsubishi Chemical Industries, Ltd.) and Yellowfluor G (Sumitomo Chemical Co., Ltd.).

Orange Dyes: C.I. Solvent Orange 1 (C.I.11920), C.I. Solvent Orange 37, C.I. Solvent Orange 40, Diaresin Orange K (Mitsubishi Chemical Industries, Ltd.), Diaresin Orange G (Mitsubishi Chemical Industries, Ltd.), and Sumiplast Orange 3G (Sumitomo Chemical Co., Ltd.).

Red Dyes: C.I. Solvent Red 8 (C.I.12715), C.I. Solvent Red 82, C.I. Solvent Red 84, C.I. Solvent Red 100, Orient Oil Scarlet #308 (Orient Chemical Industrial Co., Ltd.), Soldan Red 3R (Chūgai Chemical Co., Ltd.), Diaresin Red S (Mitsubishi Chemical Industries, Ltd.), Sumiplast Red AS (Sumitomo Chemical Co., Ltd.), Diaresin Red K (Mitsubishi Chemical Industries, Ltd.), Sumiplast Red 3B (Sumitomi Chemical Co., Ltd.), Diaresin Red EL (Mitsubishi Chemical Industries, Ltd.), Diaresin Red H (Mitsubishi Chemical Industries, Ltd.), Diaresin Red LM (Mitsubishi Chemical Industries, Ltd.), Diaresin Red G (Mitsubishi Chemical Industries, Ltd.), and Aizen Spilon Red GEH Special (Hodogaya Chemical Co., Ltd.).

Pink Dyes: Diaresin Pink M (Mitsubishi Chemical Industries, Ltd.), and Sumiplast Pink R.FF (Sumitomo Chemical Co., Ltd.).

Violet Dyes: C.I. Solvent Violet 8 (C.I.42535B), C.I. Solvent Violet 21, Diaresin Violet A (Mitsubishi Chemical Industries, Ltd.), Diaresin Violet D (Mitsubishi Chemical Industries, Ltd.), and Sumiplast Violet RR (Sumitomo Chemical Co., Ltd.).

Blue Dyes: C.I. Solvent Blue 2 (C.I.42563B), C.I. Solvent Blue 11 (C.I.61525), C.I. Solvent Blue 25 (C.I.74350), C.I. Solvent Blue 36, C.I. Solvent Blue 55, Aizen Spilon Blue GNH (Hodogaya Chemical Co., Ltd.), Diaresin Blue G (Mitsubishi Chemical Industries, Ltd.), Diaresin Blue C (Mitsubishi Chemical Industries, Ltd.), Diaresin Blue J,A,H,K,N (Mitsubishi Chemical Industries, Ltd.), and Vali Fast Blue #2604 (Orient Chemical Co., Ltd.).

Green Dyes: C.I. Solvent Green 3 (C.I.61565).

Brown Dyes: C.I. Solvent Brown 3 (C.I.11360), and Diaresin Brown A (Mitsubishi Chemical Industries, Ltd.).

Black Dyes: C.I. Solvent Black 3 (C.I.26150), C.I. Solvent Black 5 (C.I.50415), C.I. Solvent Black 7 (C.I.50415:1), C.I. Solvent Black 22, C.I. Acid Black 123 (C.I.12195), Sumisol Black AR sol (Sumitomo Chemical Co., Ltd.), and Vali Fast Black #1802 (Orient Chemical Industrial Co., Ltd.).

In addition, oleophilic dyes such as those disclosed in U.S. Pat. Nos. 3,652,284; 3,486,897; 2,751,298 and 3,506,443; Canadian Pat. No. 602,607; U.S. Pat. Nos. 3,443,939; 3,443,940; 3,443,941; 3,725,062; 3,415,644; 3,415,645; 3,415,646; 3,647,437 and 3,635,707; and Belgian Pat. Nos. 757,959; 757,960; 810,195 and 788,268 may be also employed.

Generally speaking, dyes which do not discolor upon exposure to light, heat, humidity, etc., are preferred. The color tone can be selected in accordance with the purpose and application of the ink composition.

Organic solvents which may be used to dissolve the hydrophobic dyes are those conventionally used for this purpose which are essentially immiscible with water or partially miscible with water. Suitable solvents include alcohols, esters, ketones, ethers, hydrocarbons, fats and oils, and like solvents.

As specific examples of such solvents, mention may be made of carbamates (e.g., ethyl N-phenyl carbamate and ethyl N,N-di-n-butyl carbamate), carboxylic acid esters (e.g., ethyl benzyl malonate, ethyl phthalate, $\beta$-methoxyethyl phthalate and n-hexyl benzoate), amides (e.g., acetyl p-toluidide and N-n-amyl succinimide), ethers (e.g., phenol ethers, e.g., eugenol methyl ether and hydroquinone dimethyl ether) and ketones as disclosed in U.S. Pat. Nos. 2,322,027 and 3,676,137.

Specific examples of preferable solvents include di-n-butyl phthalate, di-iso-octyl phthalate, dimethoxyethylphthalate, benzyl phthalate, triphenyl phosphate, tricresyl phosphate, diphenylmonobutyl phosphate, tributyl phosphate, tridecyl phosphate, dibutylmonohexyl phosphate, diphenyl-mono-o-chlorophenyl phosphate and other phthalic acid or phosphoric acid esters. Further, co-solvents such as those disclosed in U.S. Pat. Nos. 3,253,921; 3,574,627; etc., with specific examples including ethyl acetate, butyl acetate, nitromethane, chloroform, sec-butanol, methyl isobutyl ketone, $\beta$-ethoxyethylacetate, diethyleneglycol monoacetate, diethyleneglycol monoethyl ether, tetrahydrofuran, cyclohexane, dimethylformamide, methanol, dioxane and the like, may be employed together with the above-described solvents.

Preferably the ink composition of the present invention has a viscosity of about 1 to 3 cp at 25° C., a surface tension of about 20 to 50 dyne/cm, a pH of 9 to 11 and a conductivity of 10 to 0.1 mυ/cm.

The present invention will now be illustrated in greater detail by reference to the following examples.

EXAMPLE 1

An aqueous suspension containing 15% by weight (solid component) of Polymer 1 (vinyl polymer particle size: 0.1μ) was added gradually at room temperature to a solution prepared by dissolving 10 g of yellow dye, C.I. Solvent Yellow 19 (C.I.13900A), into 200 ml of acetone while stirring with a mixer. After thorough mixing, a large portion of the acetone was removed by evaporation. An aqueous dispersion of vinyl polymer particles impregnated with the dye (i.e., ink of the present invention) was obtained. The ink was stable and the dye did not coagulate upon storage for a long time. The viscosity of the resulting jet ink composition was 1.5 cp., the specific resistance thereof was $1.2 \times 10^5$ Ω·cm, and the surface tension thereof was 30 dyn/cm.

EXAMPLE 2

An aqueous suspension containing Polymer 1 (15% by weight) and gelatin (2% by weight) was prepared. The colored suspension was prepared in the same manner as in Example 1 except that the aqueous suspension contained gelatin. The resulting jet ink composition showed excellent stability, as well as in Example 1. In addition, ink prepared herein provided lustrous image of excellent quality due to the addition of gelatin. The viscosity of the resulting jet ink composition was 3.0 cp., the specific resistance thereof was $1.7 \times 10^5$ Ω·cm, and the surface tension thereof was 28 dyn/cm.

EXAMPLE 3

10 g of red dye, C.I. Solvent Red 8 (C.I.12715), was dissolved in the mixture of 10 g of dibutyl phthalate and 16 g of ethyl acetate while heating. The resulting dye solution was added with stirring to a warm (50° C.) mixed suspension consisting of 160 g of an aqueous suspension of Polymer 2 (20% by weight) and 5 g of a sodium dodecylbenzenesulfonate (5% by weight aqueous solution), followed by mixing 5 times through a colloid mill. Then a large portion of the solvents for the dyes was removed by evaporation. The thus obtained aqueous dispersion of vinyl polymer particles impregnated with the dye was stable and did not coagulate upon storage for a long time and could provide records of sufficiently high density. The resulting jet ink composition had a viscosity of 2.0 cp., a specific resistance of $5.0 \times 10^5$ Ω·cm, and a surface tension of 32 dyn/cm.

EXAMPLE 4

10 g of blue dye, C.I. Solvent blue 2 (C.I. 42563B), was dissolved in the mixture of 20 g of tricresyl phosphate and 20 g of ethyl acetate while heating. The resulting solution was admixed with 8 g of an aqueous suspension of Polymer 8 (20% by weight solid component) and then, the mixture was stirred with a polytron rotating with 6,000 r.p.m. for 3 minutes, followed by removal of a large portion of the solvents for the dye, to prepare requested jet ink. The resulting jet ink composition had a viscosity of 2.0 cp., a specific resistance of $5.2 \times 10^5$ Ω·cm, and a surface tension of 35 dyn/cm.

While the invention has been described in detail and with reference to specific embodiments thereof, it will be apparent to one skilled in the art that various changes and modifications can be made therein without departing from the spirit and scope thereof.

What is claimed is:

1. An ink composition for ink jet recording which consists essentially of finely divided particles of vinyl polymer impregnated with a hydrophobic dye and dispersed in an aqueous medium.

2. The ink composition of claim 1, wherein said vinyl polymer is essentially insoluble to water and, does not swell in water, but swells in solvents capable of dissolving the hydrophobic dye.

3. The ink composition of claim 1 wherein said vinyl polymer is a polymer prepared by emulsion polymerization of (1) each of (A) at least one monomer selected from the group consisting of vinyl monomers having at least a free carboxylic acid group, a free sulfonic acid group or a free phosphoric acid group or a salt thereof and (B) at least one monomer selected from the group consisting of monomers represented by the following general formula (I)

wherein X is a hydrogen atom, a methyl group or a —COOR$^1$ group; Y is a hydrogen atom, a methyl group or a —(CH$_2$)$_n$COOR$^2$ group; Z is an aryl group, a —COOR$^3$ group or a

group; R$^1$, R$^2$ and R$^3$, which may be the same or different, each represents an aliphatic group or an aryl group; and n is an integer of 0 to 3; or (2) each of (A) at least one monomer selected from the group consisting of the vinyl monomers described above, (B) at least one monomer selected from the group consisting of monomers represented by the general formula (I) above, and (C) at least one monomer selected from the group consisting of monofunctional or polyfunctional unsaturated monomers other than those monomers described in (A) and (B) above which are copolymerizable with the monomers described in (A) and (B) above and selected from the group consisting of acrylamides, methacrylamides, vinyl ethers, vinyl ketones, allyl compounds, olefins and unsaturated nitriles.

4. The ink composition of claim 1 wherein said vinyl particles have a particle size of about 0.01 to about 5 microns.

5. The ink composition of claim 1 wherein said vinyl polymer particle is present in an amount of about 2 to 20 wt.% based on the aqueous dispersion of the polymer particles.

6. The ink composition of claim 3 wherein said monomer (A) is acrylic acid, methacrylic acid, itaconic acid, 2-acrylamido-2-methylpropanesulfonic acid, mono(acryloyloxyalkyl)-phosphates or mono(methacryloyloxyalkyl)-phosphates, 7. The ink composition of claim 1, wherein said composition has a viscosity of about 1 to 3 cp at 25° C. and a pH of 9 to 11.

8. The ink composition of claim 7, wherein said composition has a surface tension of about 20 to about 50 dyne/cm and a conductivity of 10 to 0.1 mΩ/cm.

9. The ink composition of claim 1, which is a latex.

* * * * *